United States Patent [19]

Adam et al.

[11] Patent Number: 5,097,882

[45] Date of Patent: * Mar. 24, 1992

[54] TIRE TREAD AND TIRE INCLUDING TRAPEZOIDAL BLOCK ELEMENTS NESTED IN REENTRANT ANGLES OF ZIGZAG RIBS

[75] Inventors: Georges Adam, Bissen; Claude Lardo, Luxembourg, both of Luxembourg

[73] Assignee: The Goodyear Tire & Rubber Company, Akron, Ohio

[*] Notice: The portion of the term of this patent subsequent to Apr. 9, 2008 has been disclaimed.

[21] Appl. No.: 413,576

[22] Filed: Sep. 28, 1989

Related U.S. Application Data

[63] Continuation-in-part of Ser. No. 217,735, Jul. 11, 1988, abandoned.

[51] Int. Cl.$^5$ .............................................. B60C 11/06
[52] U.S. Cl. ............................ 152/209 R; 152/DIG. 3; D12/142
[58] Field of Search .......... 152/209 R, 209 D, 209 A, 152/DIG. 3; D12/141-151; 428/167, 141, 213

[56] References Cited

U.S. PATENT DOCUMENTS

| D. 224,379 | 7/1972 | Busch et al. |
| D. 240,417 | 7/1976 | Candiliotis |
| D. 240,615 | 7/1976 | Keeh et al. |
| D. 241,242 | 8/1976 | Candiliotis |
| D. 261,492 | 10/1981 | Remy |
| D. 265,184 | 6/1982 | Hammond |
| D. 286,033 | 10/1986 | Motomura et al. |
| D. 288,914 | 3/1987 | Hinkel et al. |
| 2,100,084 | 11/1937 | McNeil |
| 2,432,847 | 12/1947 | Woods |
| 2,454,750 | 11/1948 | Woods |
| 2,612,928 | 10/1952 | Buddenhager |
| 3,517,720 | 6/1970 | Brown |
| 3,550,665 | 12/1970 | Verdier |
| 3,698,462 | 10/1972 | Jacobs |
| 3,749,145 | 7/1973 | Hart et al. |
| 4,351,381 | 9/1982 | Roberts et al. |

FOREIGN PATENT DOCUMENTS

| 253204 | 11/1986 | Japan |
| 2018208 | 10/1979 | United Kingdom |
| 2051694 | 1/1981 | United Kingdom |
| 1589141 | 5/1981 | United Kingdom |

OTHER PUBLICATIONS

1975 Tread Design Guide, p. 12, 2nd row from bottom-Goodyear Rally GT 60.
1978 Tread Design Guide, pp. 14, 32 & 34.

*Primary Examiner*—Geoffrey L. Knable
*Attorney, Agent, or Firm*—T. P. Lewandowski; L. R. Drayer

[57] ABSTRACT

A tread (10) for a tire has at least three wide grooves (13,14,15,16) therein. At least two zigzag ribs (19,20,21) are bordered by said grooves and have block elements (22) nested in the reentrant angles of the ribs and separated therefrom by narrow grooves (23). The wide grooves (13,14,15,16) well remain open in a footprint of a tire while the narrow grooves (23) will close up in a footprint of a tire. Tire treads according to the invention may be provided as precured retread material, as part of a newly manufactured tire, or as part of a retreaded tire.

16 Claims, 4 Drawing Sheets

TIRE TREAD AND TIRE INCLUDING TRAPEZOIDAL BLOCK ELEMENTS NESTED IN REENTRANT ANGLES OF ZIGZAG RIBS

This is a Continuation-in-Part of application Ser. No. 217,735 filed July 11, 1988, now abandoned.

The present invention relates to tire treads and to tires provided with such treads.

The tires employed on the steering axle(s) of a large motor vehicle, such as an over-the-road tractor-trailer rig, present challenges to a tire engineer in regard to fuel economy, uniformity of wear and handling on both wet and dry roadways. Lateral traction characteristics of steer position tires are important for cornering performance. Since steer axles are most often free rolling, (that is to say non-driven) the tires used in these applications tend to exhibit nonuniform wear patterns, especially if the tire tread has a block type design. Furthermore, tires employed on driven axles require good circumferential traction. There is disclosed herein a tread structure which is believed will perform quite adequately when employed in either a non-driven steering position or a driven position on a large motor vehicle.

The features of the present invention which are believed to be novel are set forth with particularity in the appended claims. The present invention, both as to its structure and manner of operation, may best be understood by reference to the following detailed description, taken in accordance with the accompanying drawings in which:

Figure 1:
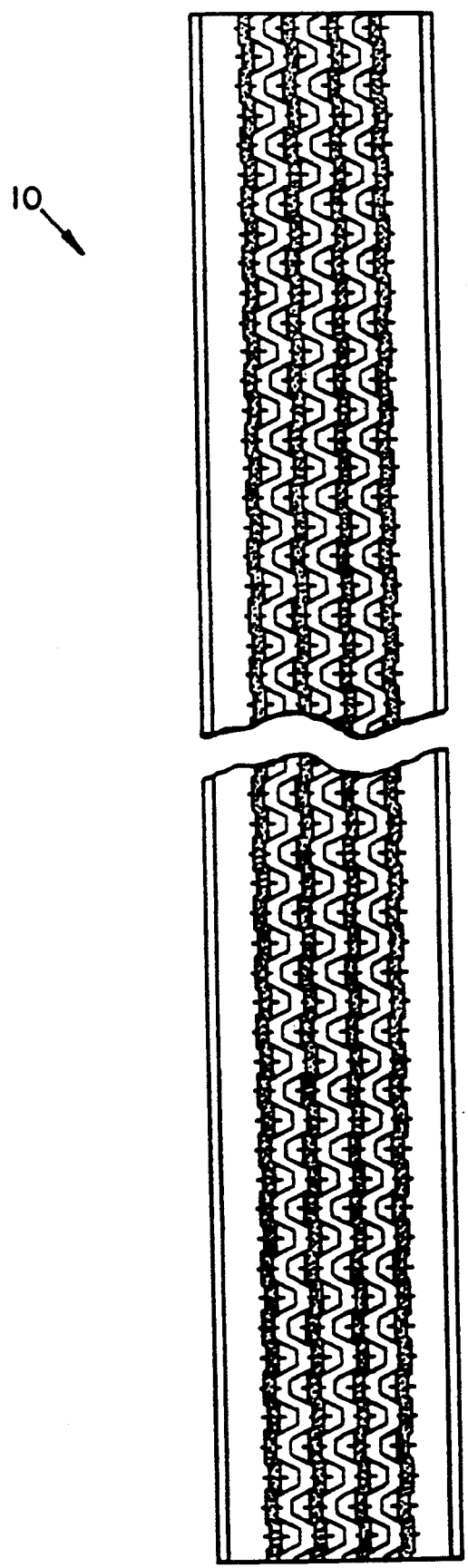
FIG. 1 is a fragmented plan view of a tire tread according to the invention.
Figure 3:
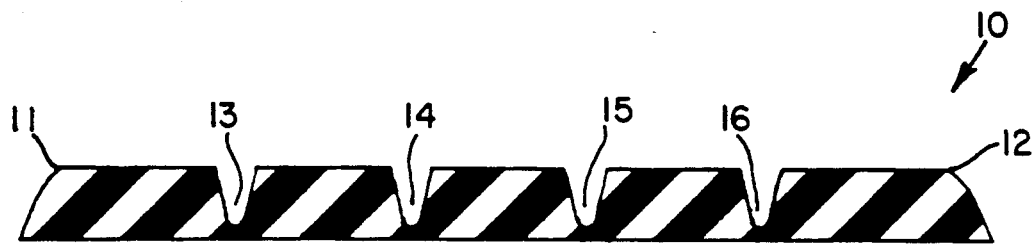
FIG. 3 is a cross-sectional view of the tire tread taken at line 3—3 of FIG. 2.
Figure 2:
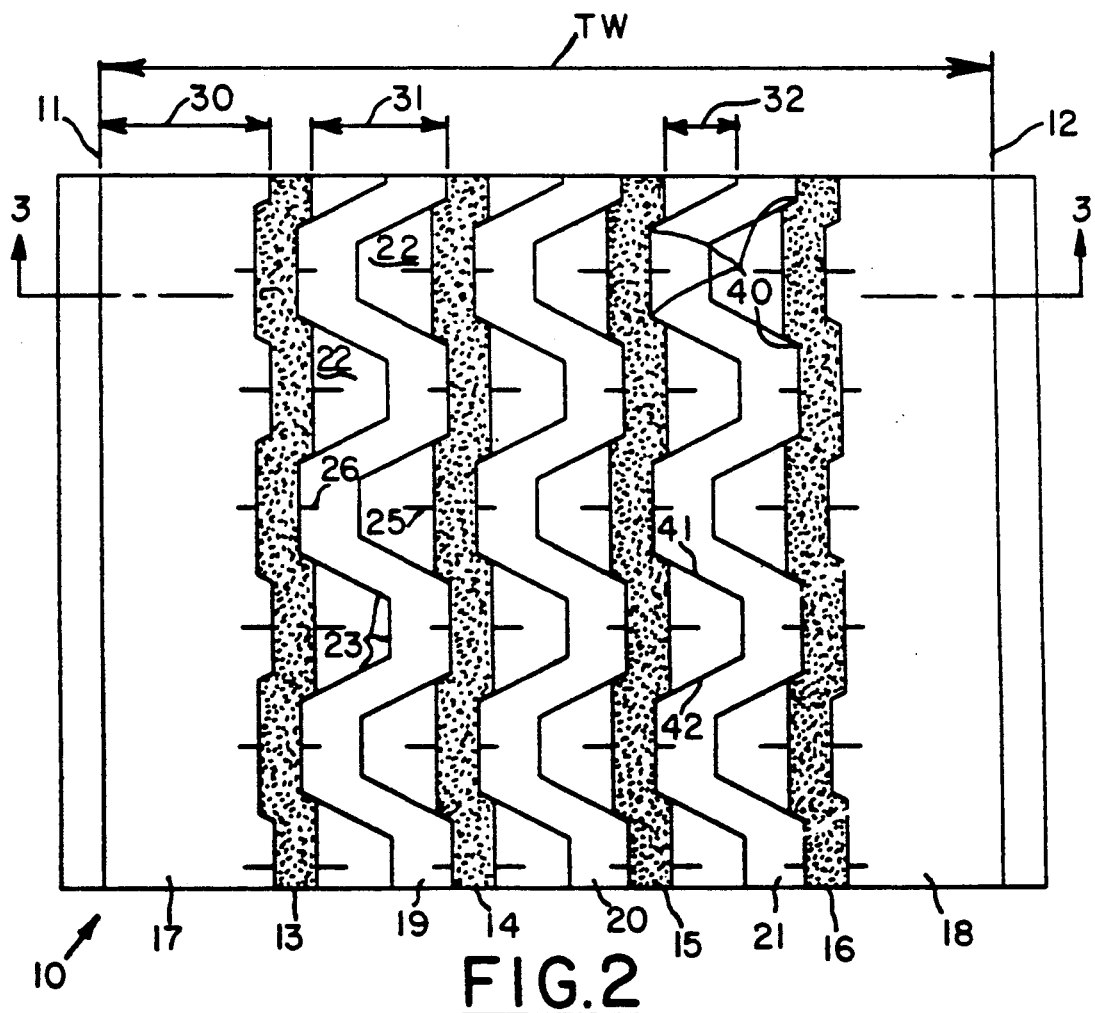
FIG. 2 is an enlarged plan view of a portion of the tire tread.

Referring first to FIG. 1, there is shown a plan view of a tire tread 10, fragmented to emphasize that the length of a tire tread is not a limiting factor for the practice of all aspects of the invention. Of course, the controlling factor in tread length is the diameter of a tire that will be mated with the tread. The tire tread 10 illustrated in FIG. 1 is understood to be an elastomeric member which is at least partially vulcanized and has a pattern of grooves and raised elements integral therewith. The elastomeric composition of the tread may include natural rubber, synthetic rubber, a blend of the two, or any other suitable material.

A tire tread 10 according to one aspect of the invention is a strip of at least partially vulcanized material which is suitable for the purpose of providing a new tread for a previously vulcanized tire carcass. Such a tread is an article of manufacture which is sometimes referred to in the tire art as precured retread material. Furthermore, it is understood that as used herein and in the claims, the term "tire" refers not only to a newly manufactured tire having a tread and carcass which are vulcanized at the same time, but also to a tire which is manufactured by providing a previously vulcanized carcass with a new tread.

Details of the structure of a tire tread 10 according to the invention, whether it is in the form of precured retread material or a tread which is integral to a tire, can best be described by referring to FIGS. 2 to 5.

A precured tire tread 10 has a longitudinal axis and a pair of shoulders 11, 12 which define the lateral edges of a ground engageable surface of the tread, while a tire 50 having a tread according to the invention may be described as having a pair of axially spaced apart tread edges 11, 12 which define the greatest axial width of the footprint of a tire employing the tread. As used herein, the footprint of a tire is understood to refer to the static contact patch of a tire that is mounted on its specified rim, inflated to its specified inflation pressure, and subjected to its rated load for that specified pressure. The values of these parameters may be determined from the manufacturer of the tire, or from an organization which sets tire industry standards such as The Tire and Rim Association in the U.S.A. or the European Tyre and Rim Technical Organization.

The ground engageable surface of a precured tread has at least three longitudinally extending wide grooves 13, 14, 15, 16 therein which will remain open in a footprint of a tire and which extend the entire length of the tread, while the corresponding grooves 13, 14, 15, 16 of a tread integral to a tire extend circumferentially thereabout. Each of the longitudinally extending wide grooves is configured such that a plane which is parallel to the centerline of the tread may be located in the groove and not intersect any wall of the groove. This feature aids in the evacuation of liquids from the footprint of a tire. The exact number of said grooves is a factor of the size of the tire which will employ the tread. For example, tires of sizes 315/80R22.5 or 11R22.5 may use treads having four of said grooves therein, as illustrated in FIGS. 1 to 5. Each said tread shoulder 11, 12, or tread edge 11, 12, and the nearest longitudinally, or circumferentially, extending wide groove 13, 16 cooperate to define a shoulder rib 17, 18. While it is preferred that the shoulder ribs 17, 18 are not laterally traversed by any grooves, it is understood that treads according to the invention may have circumferentially extending decoupling grooves 45, 46 or even very narrow and shallow laterally extending grooves therein (sometimes called sipes or blades) and still obtain essentially all of the desired benefits of this invention. Interposed between each next-adjacent pair 13, 14; 14, 15; 15, 16 of longitudinally, or circumferentially, extending wide grooves is a longitudinally, or circumferentially, extending continuous rib 19, 20, 21 which is not laterally traversed by any grooves and has a zigzag configuration. A zigzag rib as used herein and in the claims means a rib which follows a nonlinear path on either a precured tread or in a footprint of a tire employing the tread such that a plane which parallel to the centerline of the tread will repeatedly intersect lateral edges of the rib. It is understood that the number of zigzag ribs may vary in accordance with tire size, in the same way as the number of longitudinal or circumferential grooves varies.

Nested within each reentrant angle of each zigzag rib 19, 20, 21 is a block element 22, with the block elements being separated from the zigzag rib by narrow grooves 23 which close in a footprint of the tire. Generally speaking, the widths of the narrow grooves should be not greater than 1 mm. It is preferred that the nested block elements have trapezoidal shaped ground engageable surfaces and be laterally recessed into the reentrant angles of the zigzag ribs so that the ribs can present leading edges 40 to provide improved handling over treads provided with ribs having only smooth lateral edges. The leading and trailing edges 41, 42 of the nested block elements 22 should be oriented at 60° to 70° with respect to the longitudinal axis of a precured tread or the circumferential plane of the tire. As used herein and in the claims, a circumferential plane is a plane that is perpendicular to a tire's axis of rotation. This particular orientation of the edges 41, 42 is believed to aid in reducing the noise generated by the tread when a tire is rotated against a roadway. Furthermore, the block elements are retained in a desirable position in a tire footprint by the more stable zigzag rib itself, which aids the performance characteristics of the tire such as lateral traction.

The narrow grooves 23 separating the block elements 22 from the zigzag ribs 19, 20, 21 have depths in the range of 40% to 95%, preferably in the range of 50% to 70%, of the depth of the longitudinally or circumferentially extending wide grooves 13, 14, 15, 16. In the preferred embodiment each block element 22 has a laterally extending narrow notch 25 therein which is longitudinally, or circumferentially, aligned with a narrow notch 26 in the associated zigzag rib 19, 20, 21. These narrow notches 25, 26 have depths in the range of 70% to 95%, preferably in the range of 85% to 95% of the depth of the longitudinally or circumferentially, extending wide grooves. Preferably the depths of the narrow notches 25, 26 is greater than the depths of the narrow grooves 23. This preferred feature will allow the wear characteristics of the tread to change throughout its useful life, thereby accommodating more uniform wear patterns in the tread. The widths of the narrow notches 25, 26 should be not greater than 1 mm so that the notches will close up in a footprint of a tire.

A tire tread according to the invention has a net-to-gross ratio in the range of 65% to 90%, preferably in the range of 70% to 80%, depending upon the size of the tire. Net-to-gross ratio is the ratio of the actual ground contacting area in a footprint of a tire to the total area of the footprint.

Figure 4:
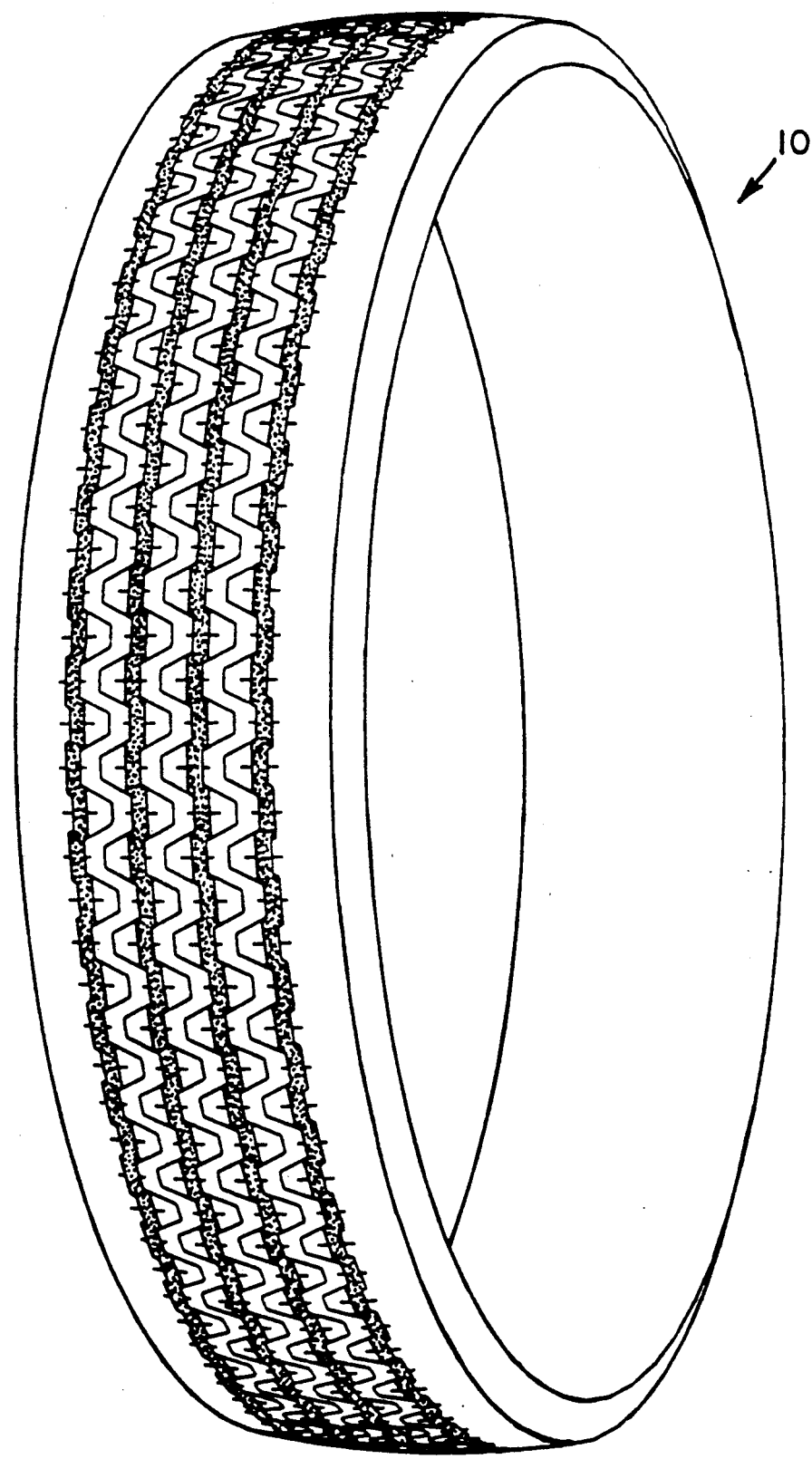
FIG. 4 is a perspective view of the tire tread formed into a ring.

The lateral distance TW between the tread edges, or shoulders, 11, 12 is referred to as the tread width TW. If the tread is integral with a tire, the tread width TW may be determined as the greatest axial width of a tire's footprint. The shoulder ribs 17, 18 each have a width that is in the range of 15%to 25% of the tread width TW as measured at 30 in FIG. 2. The zigzag ribs 19, 20, 21 each have a width that is in the range of 15% to 20%of the tread width TW as measured at 31 in FIG. 2. Put another way, the zigzag circumferential ribs 19,20,21 each have an amplitude in the range of 15%to 20%of the tread width TW. The nested block elements 22 each have a lateral, or axial, width in the range of 7% to 10% of the tread width TW as measured at 32 in FIG. 2. Referring to FIG. 4, there is shown a tire tread according to the invention formed into an annular ring. Such treads, known in the art as "ring treads" have been employed in some retreading processes, and are understood to be within the scope of the present invention.

Figure 5:
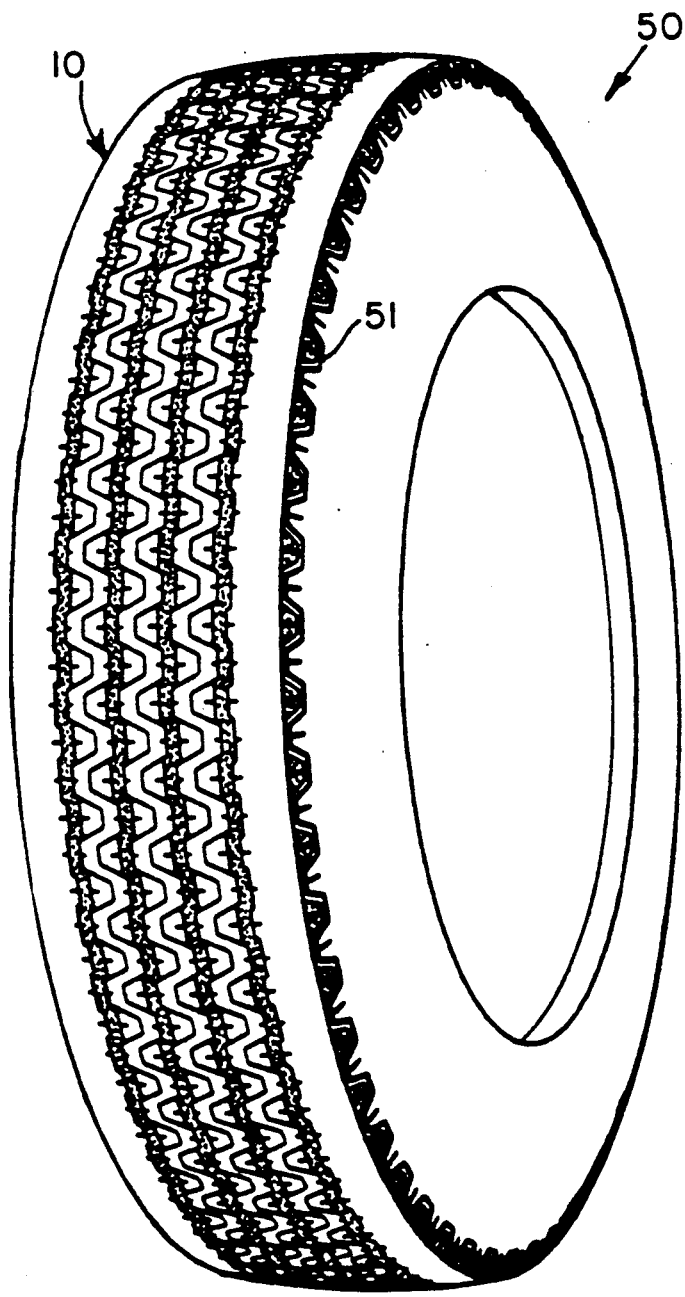
FIG. 5 is a perspective view of a tire having a tread according to the invention.

Referring next to FIG. 5, there is shown a tire 50 having a tread 10 according to the invention integral therewith. The tire 50 has an axis of rotation and the tread 10 extends circumferentially about said axis. Preferably, the tire is of the type generally known in the tire art as a radial-ply pneumatic tire, however, it is understood that the present invention applies also to what is known in the art as a bias ply or bias-belted tire. It is believed that the present invention is most advantageously practiced in radial ply truck tires having a nominal bead diameter of at least 20 inches or precured treads for retreading radial ply truck tires. As illustrated in FIG. 5, the buttresses 51 adjoining the tread itself may have notches or grooves therein, but this is not considered to be essential to the practice of the present invention, and in fact the buttresses may be of a plain configuration as shown in FIGS. 1 to 4.

While certain representative embodiments and details have been shown for the purpose of illustrating the invention, it will be apparent to those skilled in the art that various changes and modifications may be made therein without departing from the spirit or scope of the invention.

We claim:

1. A tire tread comprising an elastomeric substance and having a longitudinal axis and a pair of shoulders which define the lateral edges of a ground engageable surface having at least three longitudinally extending wide grooves therein which extend the entire length of the tread and are each configured such that a plane which is parallel to the centerline of the tread may be located in the groove and not intersect any wall of the groove, each said shoulder and the next adjacent longitudinally extending wide groove cooperating to define a shoulder rib which is not laterally traversed by any grooves, interposed between each next-adjacent pair of longitudinally extending wide grooves is a circumferentially extending continuous rib which is not laterally traversed by any grooves and which follows a nonlinear zigzag path such that a plane which is parallel to the centerline of the tread will repeatedly intersect both lateral edges of the rib, and nested within each reentrant angle of each zigzag rib is a block element which has a trapezoidal shaped ground engageable surface and is separated from the associated zigzag rib by narrow grooves having a width of not greater than 1 mm and a depth in the range of 50% to 70% of the depth of the associated longitudinally extending wide groove, and each said block element has a laterally extending narrow notch therein having a width of not greater than 1 mm and a depth that is greater than the depths of said narrow grooves which separate the block elements from the associated rib.

2. A tire tread according to claim 1 wherein each of the nested block elements has a leading edge and a trailing edge each of which are oriented at 60° to 80° with respect to the longitudinal axis of the tread.

3. A tire tread according to claim 1 having a net-to-gross ratio in the range of 70% to 80%.

4. A tire tread according to claim 2 having a net-to-gross ratio in the range of 70% to 80%.

5. A tire tread according to claim 1 wherein each block element is laterally recessed into a reentrant angle of the associated rib.

6. A tire tread according to claim 2 wherein each block element is laterally recessed into reentrant angle of the associated rib.

7. A tire tread according to claim 3 wherein each block element is laterally recessed into a reentrant angle of the associated rib.

8. A tire tread according to claim 4 wherein each block element is laterally recessed into a reentrant angle of the associated rib.

9. A tire tread according to claim 1 wherein said tread is integral to a radial-ply pneumatic tire having a nominal bead diameter of at least 20 inches.

10. A tire tread according to claim 2 wherein said tread is integral to a radial-ply pneumatic tire having a nominal bead diameter of at least 20 inches.

11. A tire tread according to claim 3 wherein said tread is integral to a radial-ply pneumatic tire having a nominal bead diameter of at least 20 inches.

12. A tire tread according to claim 4 wherein said tread is integral to a radial-ply pneumatic tire having a nominal bead diameter of at least 20 inches.

13. A tire tread according to claim 5 wherein said tread is integral to a radial-ply pneumatic tire having a nominal bead diameter of at least 20 inches.

14. A tire tread according to claim 6 wherein said tread is integral to a radial-ply pneumatic tire having a nominal bead diameter of at least 20 inches.

15. A tire tread according to claim 7 wherein said tread is integral to a radial-ply pneumatic tire having a nominal bead diameter of at least 20 inches.

16. A tire tread according to claim 8 wherein said tread is integral to a radial-ply pneumatic tire having a nominal bead diameter of at least 20 inches.

* * * * *